United States Patent

[11] 3,612,678

| [72] | Inventors | Peter Haslam<br>Fairport;<br>Alan G. Kendall, Rochester; Anthony LaManna, Webster, all of N.Y. |
|---|---|---|
| [21] | Appl. No. | 795,795 |
| [22] | Filed | Feb. 3, 1969 |
| [45] | Patented | Oct. 12, 1971 |
| [73] | Assignee | Xerox Corporation<br>Rochester, N.Y. |

[54] APPARATUS FOR VIEWING AND REPRODUCING ENLARGED COPIES OF MICROFILM
7 Claims, 6 Drawing Figs.

[52] U.S. Cl. .................................................... 355/5,
355/11, 355/45, 95/4.5
[51] Int. Cl. .................................................... G03g 15/04
[50] Field of Search .......................................... 355/5, 11,
45, ; 353/3; 95/4.5

[56] References Cited
UNITED STATES PATENTS

| 2,432,704 | 12/1947 | Warman .................... | 355/45 |
| 3,183,768 | 5/1965 | Rosenburgh et al. ......... | 355/45 |

FOREIGN PATENTS

| 982,906 | 2/1951 | France ...................... | 353/3 |
| 636,391 | 4/1950 | Great Britain ............... | 353/3 |

Primary Examiner—Samuel S. Matthews
Assistant Examiner—E. M. Bero
Attorneys—Norman E. Schrader and James J. Ralabate ABSTRACT: An improved recording system for reproducing enlarged copies from microfilm on ordinary paper which utilizes a dual imaging optical apparatus to facilitate handling and viewing of microfilm to be reproduced. The apparatus includes a projection means for projecting light rays onto different imaging planes and a mirror mechanism adapted for pivotal movement on different axes to enable viewing and recording of the image.

INVENTORS
PETER HASLAM
ALAN G. KENDALL
ANTHONY J. LA MANNA
BY
*Melvin A. Klein*
ATTORNEY

APPARATUS FOR VIEWING AND REPRODUCING ENLARGED COPIES OF MICROFILM

This invention relates in general to electrostatic recording and in particular to an improved recording system for reproducing enlarged copies from microfilm on ordinary paper.

Man's inability to keep abreast of the volume of data now being generated has resulted in the development and use of rapid recording, indexing, and retrieval methods in which microreproduction plays a great role. As a result there has been a great demand for a machine which produces multiple enlarged copies of high quality from microfilm automatically on ordinary paper for wide distribution.

One of the most commercially successful copying machines is that disclosed in U.S. Pat. No. 3,062,109 to Mayo et al. issued on Nov. 6, 1962. This machine is used for reproducing multiple copies from opaque full-size originals which are placed on a platen on the top of its disklike shape. As useful as this machine may be, as evidenced by its commercial acceptance, it is not presently used to reproduce enlarged copies from microfilm. A major problem in the development of such a microreproduction system is the ease of handling the microfilm for viewing to select the desired frame or frames and then imaging in the recording plane to produce high-quality enlarged prints.

The present invention is intended to be an improvement over the desk-type electrostatic machine copier described in the Mayo et al. patent above and also over a modified version adapted for the production of multiple prints from microfilm as disclosed in copending application Ser. No. 506,386 in the names of David R. Stokes et al. filed on Nov. 4, 1965. More specifically, an improved optical system of the invention greatly facilitates reproducing enlarged hard copies from microfilm input as well as from conventional documents. Although there are devices for effecting microfilm printout there is none for rapidly handling and viewing the microfilm and then automatically producing multiple enlarged copies of a frame or frames on ordinary copy paper.

It is therefore an object of this invention to improve electrostatic recording machines used for reproducing enlarged copies of microfilm data.

Another object of this invention is to improve optical systems in electrostatic recording machines to facilitate handling and viewing microfilm to be reproduced on ordinary paper.

Another object of this invention is to view and rapidly reproduce a frame or frames of microfilm with no movement of the film relative to the optical centerline.

Another object of this invention is to employ dual imaging optical apparatus to view and reproduce enlarged copies automatically from microfilm.

These and other objects of the invention are attained by the new and improved apparatus of the present invention by projecting microfilm image rays along different optical paths for rapid viewing and film handling and then for recording purposes in order to make multiple enlarged copies of the microfilm automatically.

For a better understanding of the invention, as well as other objects and further features thereof, reference is had to the following detailed description of the invention to be read in conjunction with the accompanying drawings wherein.

Figure 1:
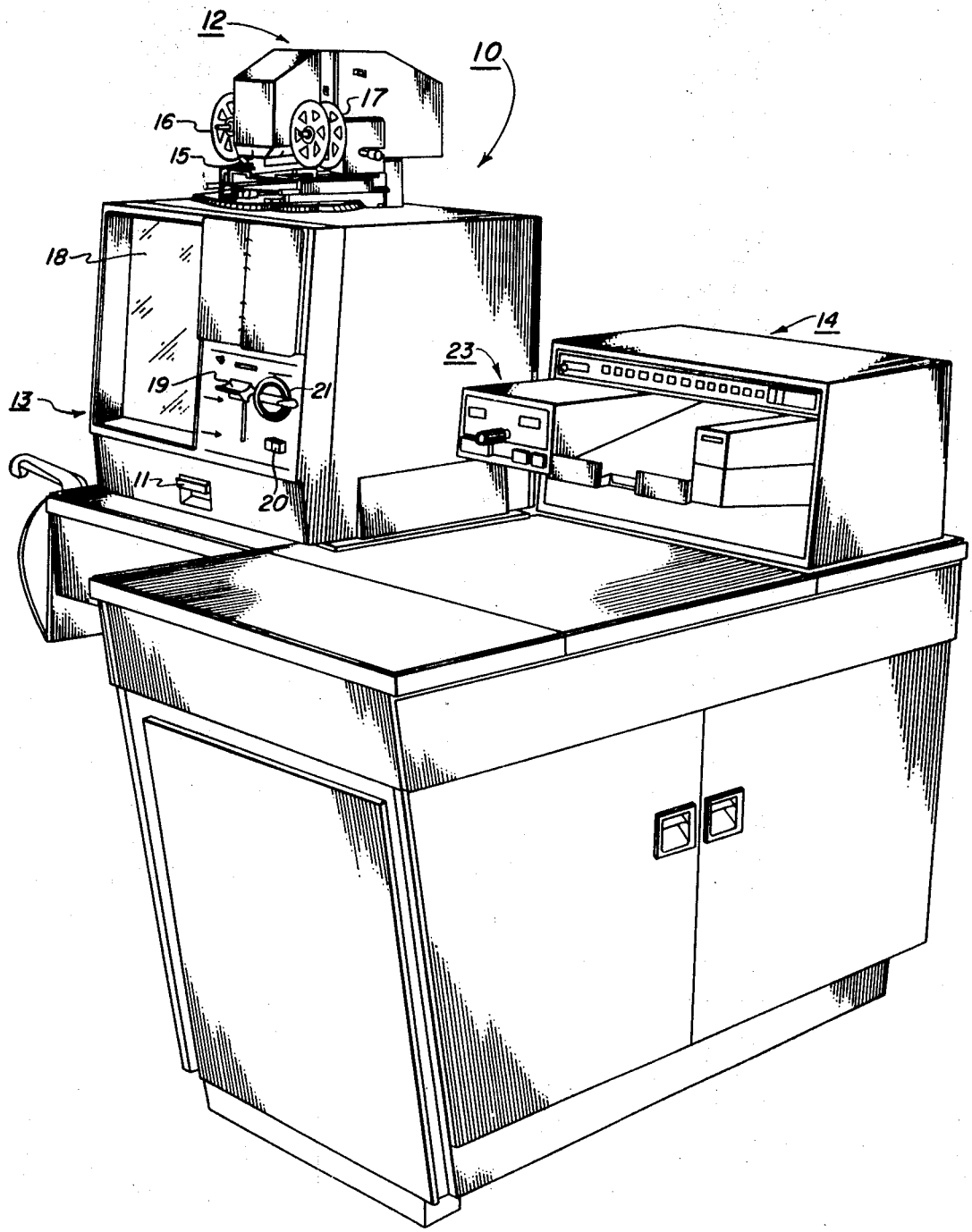
FIG. 1 is a perspective view of an automatic microfilm-copying machine adapted for reproducing enlarged copies according to the present invention.
Figure 2:
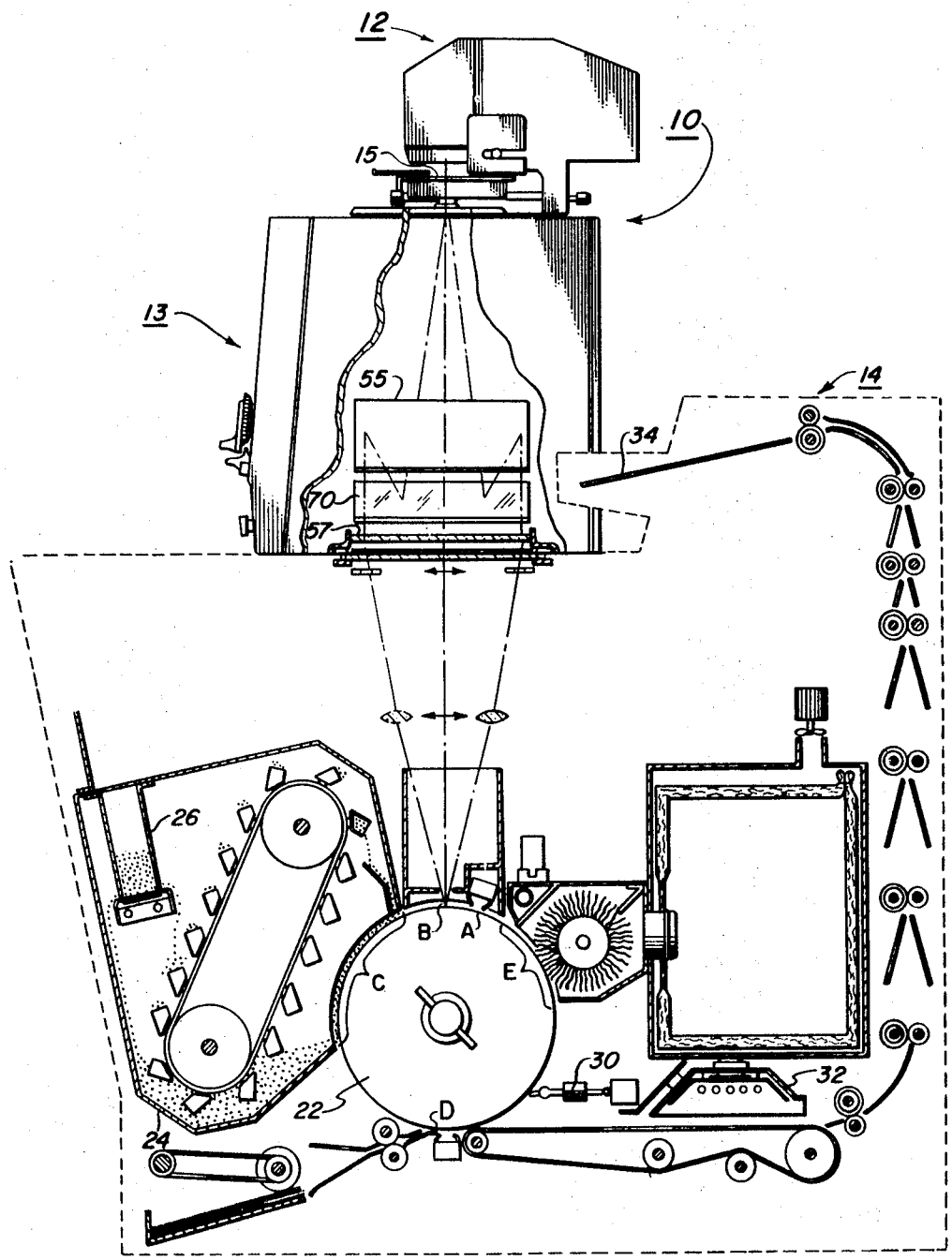
FIG. 2 illustrates schematically the various processing stations of the machine adapted for continuous and automatic operation and incorporating an optical scanning system for use with the present invention.
Figure 3:
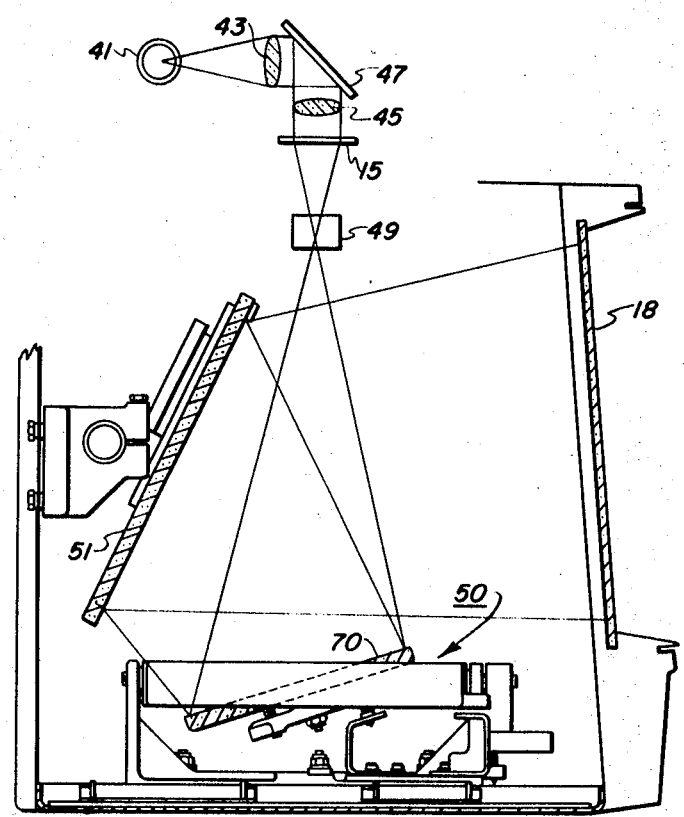
FIG. 3 is a schematic view of the optical system of the present invention when in the position of viewing and handling the microfilm.
Figure 4:
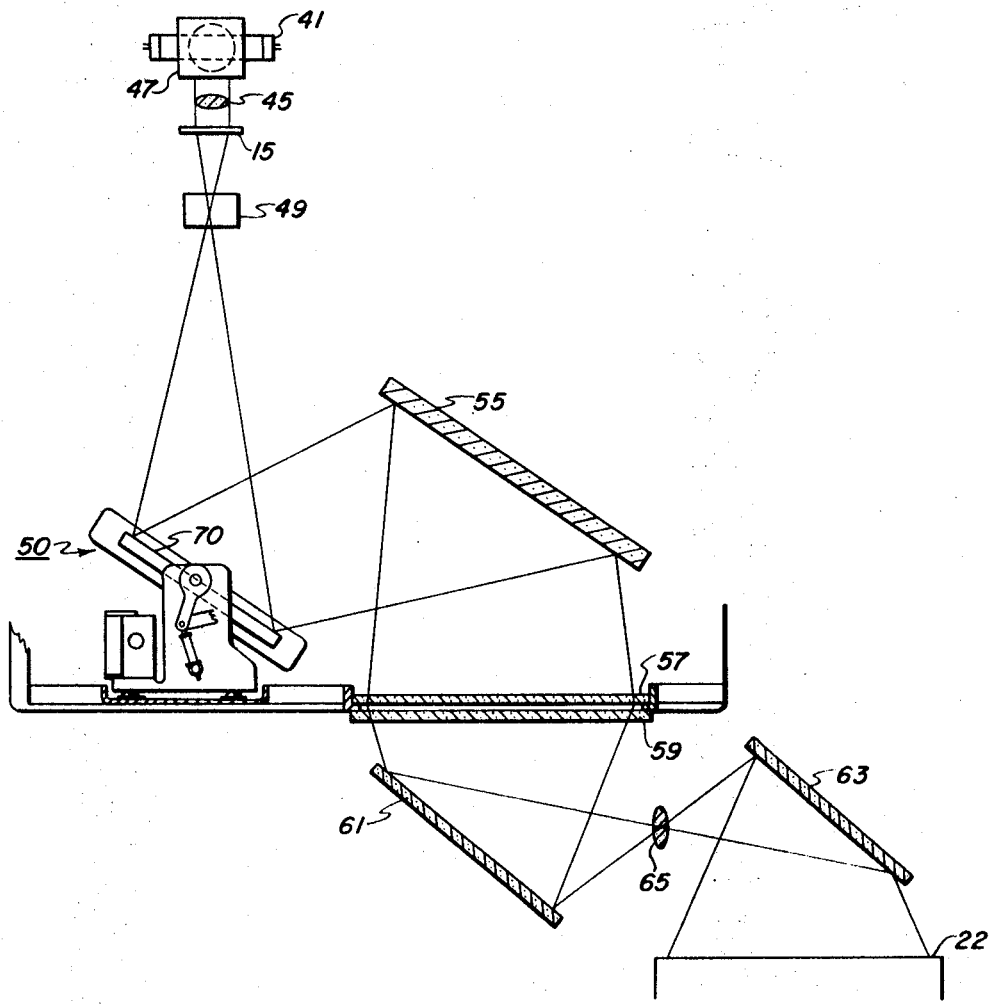
FIG. 4 is a schematic view of the optical system of the present invention when in the position of reproducing enlarged copies of the microfilm.

Referring now to the drawings there is shown in FIG. 1 microfilm-copying apparatus constructed in accordance with the present invention and generally designated 10 comprising a projector assembly 12, a reader assembly 13 and a copier-processing assembly 14. Microfilm-copying apparatus 10 reproduces enlarged copies of microfilm 15 which is supported on a supply roll 16 and takeup roll 17. It should be understood, however, apparatus 10 is also capable of reproducing microfilm on aperture cards and microfiche sheets which are adapted to be mounted on the projector assembly 14.

Reader assembly 13 comprises a viewing screen 18 and a control panel having View/Print lever 19, projector On and Off switches 20, a release handle 11, and a microfilm scan control knob 21. View/Print lever 19 has two positions and is movable upwardly for viewing and downwardly for the printing cycle according to the present invention as will be described more fully hereinafter. Microfilm 15 is adapted for rapid transport as by a reversible motor unit not shown or manual operation as by cranking knob 21 to selectively position the microfilm in the optical path for viewing and/or recording. The reader assembly is slidably connected to apparatus 10 as described more fully in copending application Ser. No. 795,814, filed Feb. 3, 1969.

Copier-processing assembly 14 comprises a xerographic recording plate made up of a photoconductive layer on a conductive backing formed in the shape of a drum 22. Drum 22 is mounted on a shaft which is journaled in a frame to rotate past a plurality of processing stations to reproduce enlarged copies of microfilm 15. A control panel 23 controls the number of copies desired as described in the Mayo et al. patent above.

For the purpose of the present disclosure, the several processing stations in the path of movement of the drum surface may be described functionally, as follows:

A charging station A at which a uniform electrostatic charge is deposited on the photoconductive layer of the drum.

Next in the path of motion of the drum is an exposure station B at which an enlarged light or radiation pattern of the microfilm to be reproduced is projected onto the drum surface to dissipate the drum charge in the exposed areas to form a latent electrostatic image.

Adjacent to the exposure station is a developing station C at which there is positioned a developer apparatus including a sump for accumulating developer material 24 comprising toner particles. As toner powder images are formed, additional toner particles are supplied to the developing material in proportion to the amount of toner deposited on the drum by a toner dispenser 26.

Positioned next adjacent to the developing station is an image transfer station D at which the powder image is electrostatically transferred from the drum surface to a support material, such as paper, in right reading form.

Immediately subsequent to transfer is a stripping device 30 for removing the support material from the drum surface. After stripping, the powder image is fused to the support material by a fuser device 32 and then transported to copy holder 34 from which multiple enlarged copies of the microfilm are immediately available.

The final station E is a drum-cleaning and discharge station at which the drum surface is brushed to remove residual toner particles remaining after image transfer and at which the drum surface is exposed to a relatively bright light source to effect substantially complete discharge of any residual electrostatic charge remaining thereon.

The above brief description of the processing stations is believed sufficient for purposes of the present invention. A more detailed description of the processing stations may be found in U.S. Pat. No. 3,062,109.

In accordance with the present invention, microfilm-copying apparatus 10 enables a machine operator to rapidly view and handle microfilm until a selected frame or frames appear on screen 18 at which time printing of single or multiple copies is effected automatically. To this end an image projection system comprises light from a lamp 41 passing through a pair of condenser lenses 43, 45 separated by a mirror 47 which projects the light beam downwardly through microfilm 15. A lens 49 projects the film image onto a movable mirror mechanism 50 which serves to receive and reflect light rays for both viewing and recording as will become more apparent. A fixed mirror 51 receives the light rays for projection onto a viewing screen 18 in one phase of operation so that an operator on the opposite side of the screen is able to view the image from the front of the machine in right reading form. In another phase of operation microfilm copier apparatus 10 produces multiple enlarged copies of the microfilm 15 onto ordinary paper. To achieve this mirror mechanism 50 is actuated onto a different optical axis so that the image is projected onto the recording plane in a manner as will be understood.

For the production phase of the film image is received by mirror mechanism 50 which now reflects the image onto a print mirror 55 which in turn reflects the image through a suitable light-gathering device 57 such as a fresnel lens. Typical materials for light-gathering device 57 are plastic, frosted glass and mixtures thereof. Additional information on lenses of this type can be found in copending application Ser. No. 551,584 filed on May 20, 1966. Lens device 57 is placed approximately at the focal plane of the copier assembly optical system which is on platen 59 of the copier assembly. Platen 59 defines an object plane of the copier reproducing system which houses fixed mirror 61, 63 separated by scan lens 65. Thus, the portion of the optical system above platen 59 serves to produce an enlarged optical image of microfilm 15 at the platen. In this manner, it is possible to produce a right reading image on viewing screen 18 or alternatively direct an enlarged image of the microfilm through a copier platen of the copying assembly which in turn scans the image to produce a latent electrostatic image on the drum 22.

Figure 5:
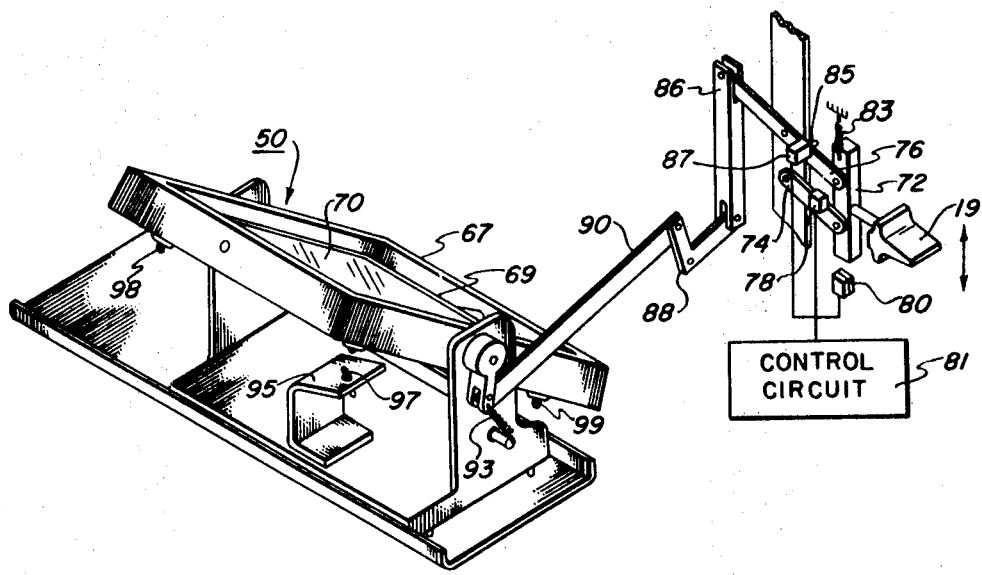
FIG. 5 is a perspective view of a movable mirror mechanism of the present invention in position for reflecting light rays along the optical axis for image viewing.
Figure 6:
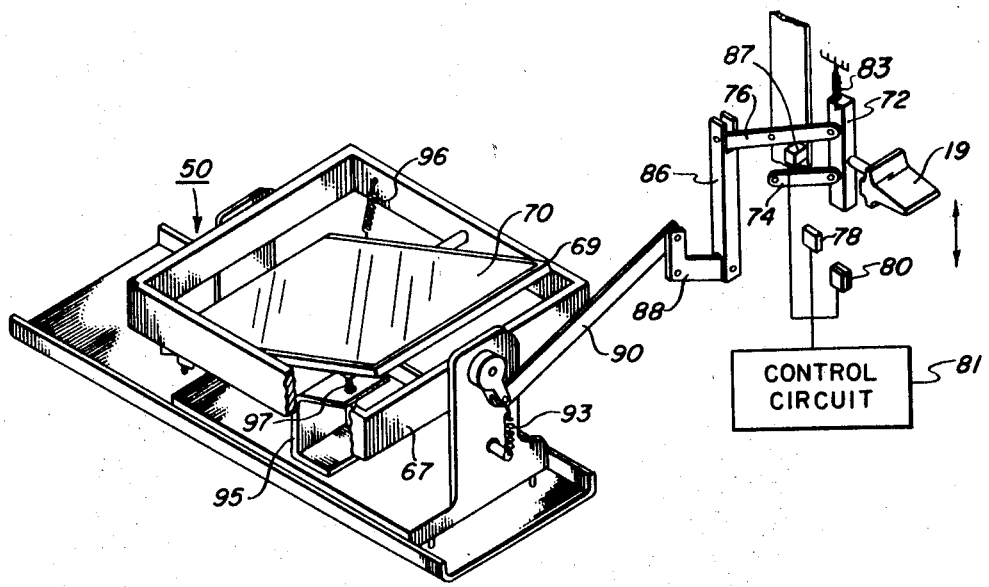
FIG. 6 is a perspective view of the movable mirror mechanism shown in FIG. 5 in a different position for reflecting light rays during the image-recording cycle.

Referring now to FIGS. 5, 6 there is shown in greater particularity the optical system of the invention including movable mirror mechanism 50 which enables optical imaging at different imaging planes on different optical axes. Movable mirror mechanism 50 comprises an outer support member 67 pivotally supported on the machine frame and an inner support member 69 carrying a mirror 70 which is pivotally supported on outer support member 67. A lever member 72 is connected to View/Print lever 19 and supported by pivot links 74 and 76. In operation when View/Print lever 19 is in the upward position, microfilm 15 is viewed on screen 18. For producing enlarged copies of the microfilm lever 19 is actuated downwardly causing lower pivot link 74 into engagement with a lever lock switch 78 mounted in the path of lever member 72. When lever member 72 is moved in its lowermost position, lever member 72 actuates a copier print switch 80. Switches 78 and 80 are coupled to a copier control circuit 81 which serves to energize copier processing assembly 14 including the processing stations described above. Upon releasing the View/Print lever 19, a spring 83 causes lever 19 and lever member 72 to move upwardly and therefore deenergizes the copier print switch 80 thereby enabling the processing assembly to maintain operation as required for producing multiple enlarged copies of the microfilm. As previously mentioned, the control circuit for the processing assembly is described in the above Mayo et al. patent. A locking member 85 actuated by a solenoid 87 which is electrically coupled to switch 78 and control circuit 81 is moved across the path of upper pivot line 76 thereby preventing lever 19 and lever member 72 from being moved upwardly until the desired number of copies of microfilm 15 have been reproduced. At the proper time, solenoid 87 receives a signal whereby locking member 85 is withdrawn from the path.

In accordance with the present invention, upper pivot link 76 is connected to a vertical link 86 which in turn is connected to a pivot arm 88 which serves to impart linear movement to an elongated horizontal link 90. It will now be appreciated that as View/Print lever 19 is moved down link 90 is moved to the left causing outer support member 67 to move in a clockwise direction whereby the mirror 70 is optically positioned for reproducing enlarged copies of the microfilm. A compression spring 93 acts to reinforce outer support member 67 in either a viewing or printing position with a togglelike action.

When it is desired to position movable mirror mechanism 50 in position for viewing microfilm 15, View/Print lever 19 is moved upwardly causing horizontal link 90 to move to the right, thereby rotating outer support member 67 counterclockwise. As a result, inner support member 69 carrying mirror 70 is pivoted on an axis through outer support member 67 due to the action of a fixed projection member 95 on the mirror 70. Arranged on projection member 95 is a stop member 97 which is adjustable as by threads to obtain proper mirror alignment during the viewing phase of operation. A spring member 96 serves to return mirror 70 to a planar position paralleled to outer support member 67 when in the reproducing phase of operation. Also adjustable stops 98 and 99 maintain alignment of outer support member 67 when pivoted to the position for the viewing and print modes of operation.

From the foregoing, it will be quite apparent that the above carrying apparatus enables rapid handling and viewing of microfilm and also printing of multiple enlarged copies automatically to provide very high-quality copy prints. Further, it will be readily appreciated that such a machine is greatly desired in view of the great volume of data now being put onto microfilm film which must ultimately be reproduced onto copy sheet for wide dissemination. Heretofore, the making of multiple copies of a microfilm frame or frames was a slow and tedious process in that the film could not be properly viewed and handled or by necessity the machine was cumbersome and slow in operation or required specialized processing. By the present invention, it is possible to produce multiple enlarged copies of a microfilm on ordinary copy sheets and yet retain all the advantages of a normal office copier as well.

While the invention has been described with reference to the structure disclosed herein, it is not confined to the details set forth. In this application it is intended to cover such modifications or changes that may come within the purposes of the improvements of the scope of the following claims.

What is claimed is:

1. In an automatic electrostatic recording apparatus in which a recording member is continuously moved past a plurality of processing stations to produce multiple enlarged copies of microfilm information, an improved optical system to enable viewing and copying of microfilm information comprising:
   projection means including mirror means for projecting light rays of microfilm information onto a first imaging plane for image viewing and a second imaging plane substantially perpendicular to said first imaging plane for image recording,
   said mirror means including a single planar reflecting member being pivotally mounted on different axes which correspond to each of the imaging planes, and
   control means for alternatively pivoting said reflecting member on said axes between an image-viewing position and an image-recording position according to whether the microfilm information is to be viewed or recorded.

2. Apparatus according to claim 1 wherein said mirror means comprises an outer support member pivotally supported on a frame on a one of said axes and an inner support member carrying said planar reflecting member pivotally supported by said outer member on the other of said axes and spring bias means associated with said support members.

3. Apparatus according to claim 2 wherein said frame has an adjustable stop for positioning said planar reflecting member at a predetermined planar position against the action of said spring bias means.

4. Apparatus according to claim 1 wherein said reflecting member is prevented from pivotal movement on a one of said axes by an electrical circuit means operative to actuate a stop member until a predetermined number of enlarged copies has been produced.

5. An optical mirror system for a microfilm information system comprising
- a frame,
- an object plane positioned on an optical path of said frame,
- mirror means interposed in the optical path including an outer support member pivotally supported on said frame on a first axis and an inner support member carrying a planar mirror pivotally supported by said outer member on a second axis, and spring bias means associated with said inner and outer support members,
- at least two substantially perpendicular imaging planes included in the optical path with each imaging plane being associated with a different one of the pivot axes of said mirror means, and
- control means for alternatively pivoting said planar mirror on said axes to first and second optical positions for reflecting image radiation at the different imaging planes.

6. A system according to claim 5 wherein said control means includes an electrical circuit operative to actuate a stop member to prevent pivotal movement of said planar mirror out of a one of said optical positions for a predetermined interval.

7. In an automatic electrostatic recording apparatus in which a recording member is continuously moved past a plurality of processing stations to produce multiple enlarged copies of microfilm information, an improved optical system to enable viewing and copying of microfilm information comprising:
- projection means including mirror means for projecting light rays of microfilm information onto a first imaging plane for image viewing and a second imaging plane substantially perpendicular to said first imaging plane for image recording,
- said mirror means being pivotally mounted on different axes which correspond to each of the imaging planes,
- control means for alternatively pivoting said mirror means on said axes between an image-viewing position and an image-recording position according to whether the microfilm information is to be viewed or recorded,
- wherein said mirror means comprises an outer support member pivotally supported on a frame on a one of said axes and an inner support member carrying a planar reflecting member pivotally supported by said outer member on the other of said axes, and
- wherein said control means including an actuating lever adapted for bidirectional movement and connected to an operating linkage, said linkage being operatively connected to said outer member so that upon movement of said actuating lever in one direction pivotal movement is imparted to said mirror means on a one of said axes, and
- a positioning member supported on said frame for urging said inner support member and reflecting member against a spring bias for pivotal movement on the other of said axes when said actuating lever is moved in the other direction.